(12) United States Patent
Butler et al.

(10) Patent No.: US 8,151,248 B1
(45) Date of Patent: Apr. 3, 2012

(54) METHOD AND SYSTEM FOR SOFTWARE DEFECT MANAGEMENT

(75) Inventors: Rhonda E. Butler, Independence, MO (US); Teresa A. Mitchell, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1188 days.

(21) Appl. No.: 11/932,188

(22) Filed: Oct. 31, 2007

(51) Int. Cl.
*G06F 9/44* (2006.01)
(52) U.S. Cl. .................. 717/124; 717/125; 717/168
(58) Field of Classification Search .................. None
See application file for complete search history.

(56) References Cited

U.S. PATENT DOCUMENTS

| | | | |
|---|---|---|---|
| 7,167,870 B2 * | 1/2007 | Avvari et al. ............... | 717/124 |
| 7,401,321 B2 * | 7/2008 | Sit et al. .................... | 717/125 |
| 7,487,406 B2 * | 2/2009 | Kobrosly et al. ............ | 714/49 |
| 7,490,081 B2 * | 2/2009 | Best et al. .................. | 1/1 |
| 7,895,565 B1 * | 2/2011 | Hudgons et al. ............. | 717/106 |
| 2003/0066049 A1 * | 4/2003 | Atwood et al. ............. | 717/101 |
| 2003/0212661 A1 * | 11/2003 | Avvari et al. ............... | 707/2 |
| 2005/0204241 A1 * | 9/2005 | Tamakoshi .................. | 714/741 |
| 2005/0229045 A1 * | 10/2005 | Tamakoshi .................. | 714/38 |
| 2006/0010426 A1 * | 1/2006 | Lewis et al. ................ | 717/124 |
| 2006/0041864 A1 * | 2/2006 | Holloway et al. ........... | 717/124 |
| 2007/0168757 A1 * | 7/2007 | Kobrosly et al. ............ | 714/46 |
| 2007/0168918 A1 * | 7/2007 | Metherall et al. ........... | 717/101 |
| 2008/0046876 A1 * | 2/2008 | Clemm et al. .............. | 717/168 |

OTHER PUBLICATIONS

C Jones, Software Change Management, computer, 1996, <http://people.eecs.ku.edu/~saiedian/Teaching/Sp08/816/Papers/Background-Papers/change-mgmt.pdf>.*

Feng Qin, Rx: Treating Bugs As Allergies—A Safe Method to Survive Software Failures, Oct. 23-26, 2005, ACM, <http://dl.acm.org/citation.cfm?id=1095833>.*

Paul Luo Li, Empirical Evaluation of Defect Projection Models for Widely-deployed Production Software Systems, Oct. 31-Nov. 6, 2004, 2004 ACM, <http://dl.acm.org/citation.cfm?id=1041685.1029930>.*

Mark Sullivan, Software Defects and their Impact on System Availability—A Study of Field Failures in Operating Systems, Fault-Tolerant Computing, 1991, <http://ieeexplore.ieee.org/stamp/stamp.jsp?tp=&arnumber=146625>.*

Thomas Zimmermann, When Do Changes Induce Fixes?, MSR'05May 17, 2005, t2005ACM, <http://dl.acm.org/citation.cfm?id=1083142>.*

Steve Sims, Experience Report: The Reactis Validation Tool, ACM SIGPLAN Notices, Sep. 2007, <http://dl.acm.org/citation.cfm?id=1291151 >.*

* cited by examiner

*Primary Examiner* — Thuy Dao
*Assistant Examiner* — Cuong V Luu

(57) ABSTRACT

A computer readable medium implementing a method for managing software defects is provided. The method comprises capturing a plurality of test cases into a test case database, a plurality of software defects into a software defect record database, and a plurality of change requests into a change request database. The method also comprises managing one of test-identifiable defects using one of the plurality of test cases, one of the plurality of defect records, and one of the plurality of change requests in a first specified order. The method additionally comprises managing one of defects not-identifiable-by-test by identifying an inconsistency between two software artifacts and using the change request from the change request database, the defect record from the defect database, and the test case in the test case database in a second specified order.

20 Claims, 4 Drawing Sheets

METHOD AND SYSTEM FOR SOFTWARE DEFECT MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Development of a software system may go through a number of phases that include requirement gathering, system development, testing, and acceptance, among others. Each phase may comprise a number of sub-phases. For example, the testing phase may include test planning, test case generation, test plan execution, and test result analysis, among others. A multitude of artifacts may be created in each of the software development phases. For example, the artifacts related to the testing phase may include test cases, defect records, analysis results, and change requests, among others. The artifacts may be stored in various databases to facilitate the management of the artifacts.

Software defects may occur during the software system development. There may be a variety of software defects. The examples of software defects may include failure of a designed function, a missing function, or presence of a removed function. Management of the software defects is part of the software development lifecycle and may involve artifacts from different phases of the software development.

SUMMARY

In one embodiment, a computer readable medium implementing a method for managing software defects is provided. The method comprises capturing a plurality of test cases into a test case database, a plurality of software defects into a software defect record database, and a plurality of change requests into a change request database. The method also comprises managing one of test-identifiable defects using one of the plurality of test cases, one of the plurality of defect records, and one of the plurality of change requests in a first specified order. The method additionally comprises managing one of defects not-identifiable-by-test by identifying an inconsistency between two software artifacts and using the change request from the change request database, the defect record from the defect database, and the test case in the test case database in a second specified order.

In one embodiment, a system for managing software defects is provided comprising a test case database, a software defect record database, a change request database, and a data dashboard. The test case database contains a plurality of test cases, each of the test cases comprising a test case identifier. The software defect record database contains a plurality of software defect records, each of the software defect records comprising a software defect record identity and a test case identity associated with the software defect record. The change request database contains a plurality of change requests, each of the change requests comprising a change request identity and an associated software defect record identity. The data dashboard is configured to analyze data elements from the test case database, the software defect record database, and the change request database, and allow for management of a test-identifiable defect and a defect not-identifiable-by-test.

In another embodiment, a data dashboard for managing software defects is provided comprising a graphical user interface, an analysis module, a metrics generator, and a local data store. The graphical user interface allows a user to enter queries for a data element from one of a plurality of databases comprising a test case database, a defect record database, and a change request database, and to navigate from a first data element from one of the plurality of databases to a second data element from one of the plurality of databases. The analysis module is configured to analyze and correlate data elements from the plurality of databases to identify an inaccuracy of a test case and a test case for reuse for a new functional requirement, and facilitate management of a defect not-identifiable-by-test and a test-identifiable defect. The metrics generator is configured to generate a metrics report based on a criterion entered at the graphical user interface. The local data store is configured to hold a subset of the plurality of databases.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One issue related to managing software defects is to organize and associate a multitude of artifacts created during the development of a software system in a way that facilitates identifying the root cause of a software defect. Some software defects may be identified through a test case. Other software defects may not be identified through test cases. The embodiments of the present disclosure capture the artifacts generated during the testing and software defect management phase into three databases: a test case database, a defect record database, and a change request database. The three databases are linked to each other and other artifact databases in a way that promotes identification of not only those software defects that may be identified through test cases, but also those defects that may not be identified through test cases, or defect not-identifiable-by-tests. The embodiments of the present disclosure also provide a data dashboard as a focal point for the software defect management that is configured to synthesize and analyze data elements from the databases and provide a graphic user interface for a user. The data dashboard is also configured to generate a variety of metrics on software defects, including analytic reports for use by a management team.

Figure 1:
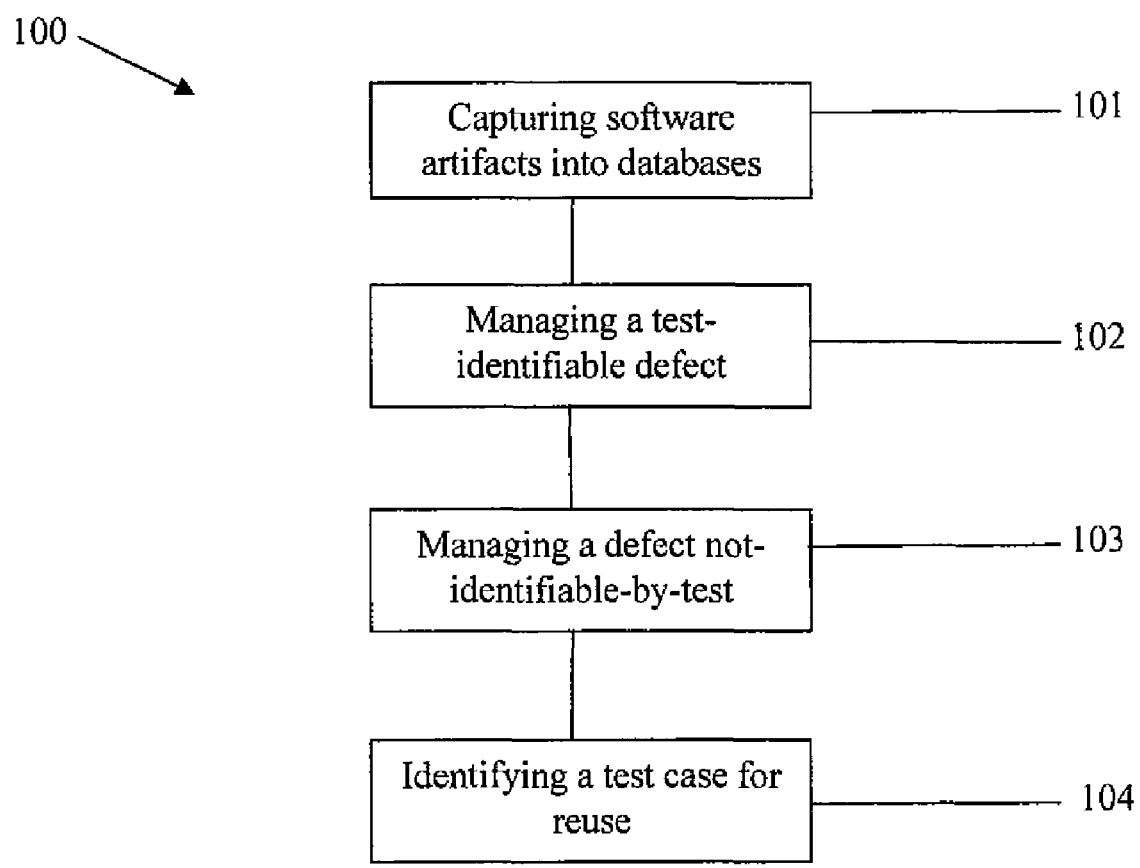
FIG. 1 illustrates a method for managing software defects according to one or more embodiment of the disclosure.

FIG. 1 shows a method 100 for managing software defects. The method comprises capturing a variety of software artifacts in various databases, managing a test-identifiable defect, managing a defect not-identifiable-by-test, and identifying test cases for reuse.

Block 101 illustrates the step of capturing a variety of software artifacts in various databases. During the lifecycle of a software system development, a variety of artifacts are generated. The exemplary artifacts may include functional requirement documents, detailed requirement documents (which contain refined functional requirements with additional details for developers), programming source codes, test plans, test cases, software defect records, change requests, and others. The type of database to be used, such as a relational database or an object-oriented database is a matter of design choice. In one embodiment, test cases, software defects, and change requests, are captured in three separate databases. Entries in each of the three databases have at least one common linking field that allows one data element or entry from one of the three databases to be traced to related data elements or entries of any of the other two databases. The linking field may be a functional requirement (FR) identifier (ID), an application ID, a test case ID, or a defect ID.

Block 102 illustrates the step of managing a test-identifiable defect. One approach to managing software defects is a test-based defect management. In this approach, the process of identifying and correcting a software defect is based on testing. One or more test cases may be created for each functional requirement. Once the development phase of a software system is completed, the test cases are executed to verify each function of the system as specified in the requirements. Failure of a test case indicates a defect in the software system. In such a case, a software defect record is generated that identifies the failed test case and that may contain a description and diagnosis of the defect. Then a change request is created to initiate an action to correct the defect. In one embodiment, the exemplary process of the test-based defect management may comprise the three steps in sequential order: testing, generating a defect report, and creating a change request to initiate a corrective action.

Block 103 illustrates the step of managing a defect not-identifiable-by-test. Some software defects may not be identified through test cases. These types of defects may come from a variety of sources, and one of them may be an inconsistency between a functional requirement and application capabilities. For example, an obsolete function may have been removed from the previous version of a software system. However, this removal of this function was not propagated to the functional requirement database for a number of reasons such as oversight on a developer's part. In such a case, a test case may not identify that the functional requirement should have been removed. This type of software defect may be identified by uncovering inconsistencies or gaps between a data element from one database and a data element from another database. This type of software defect may also be uncovered during a late phase of the software development, such as the testing phase. For example, a missing button may be uncovered by a tester while testing the function behind the button. As described above, the process for managing a test-identifiable defect may include three steps in the specified order: detecting a test case failure, generating a defect report, and creating a change request to initiate a corrective action. In contrast, the process for managing the defect not-identifiable-by-test may start from creating the change request, generating the defect record, creating the test case for the missing requirement, and ends with updating the requirement database with a new requirement.

Block 104 illustrates the step of identifying a test case for reuse for a new functional requirement. The mechanism for identifying an inconsistency between a test case and a functional requirement also may be used to identify a test case for reuse. If a consistency or match is found between a test case from the test case database and a new functional requirement, then the test case may be used for the new functional requirement.

Figure 2:
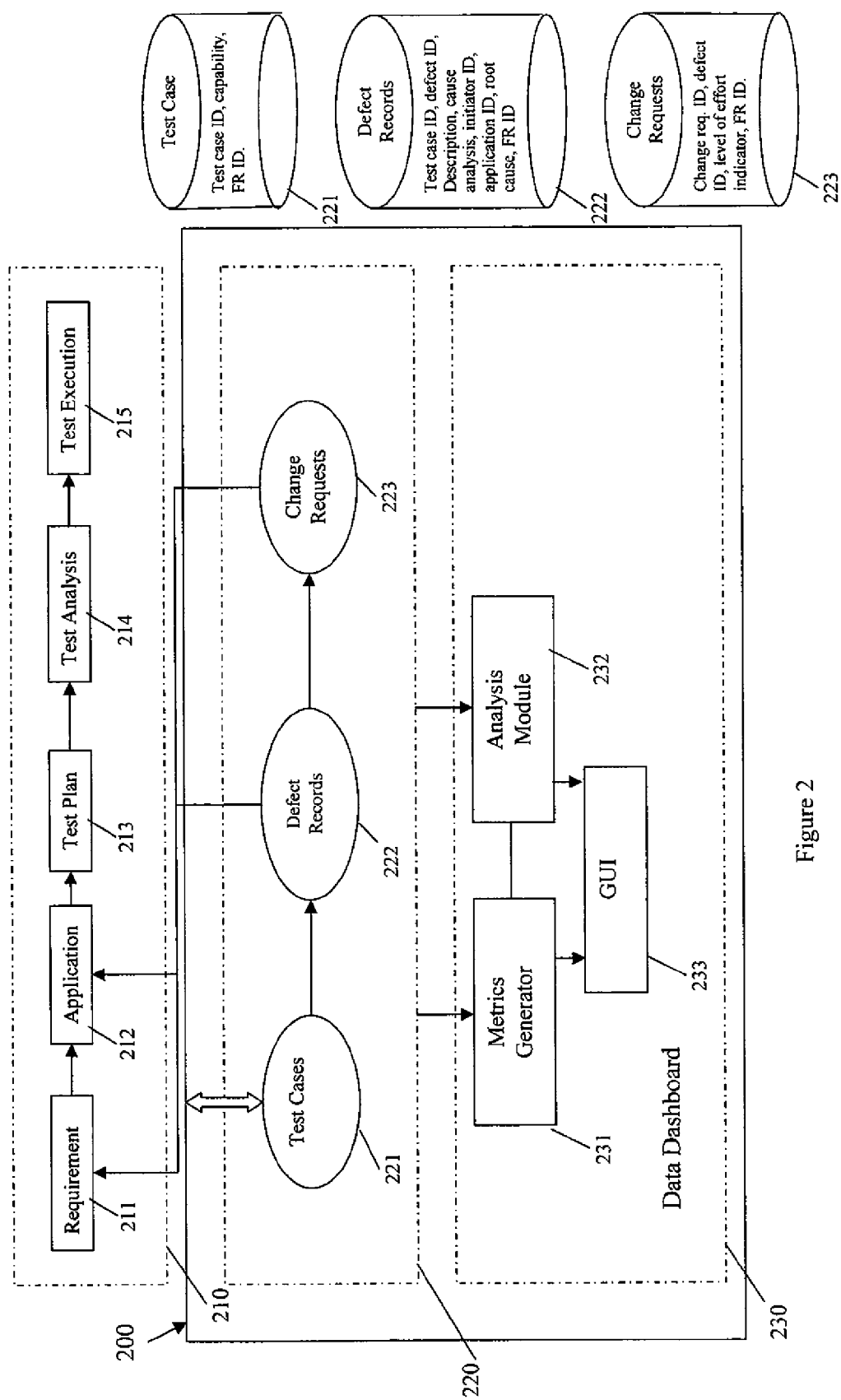
FIG. 2 illustrates a block diagram for a software defect management system according to one embodiment.

FIG. 2 illustrates an exemplary system 200 for software defect management. The system is associated with a software development lifecycle 210 and comprises a database layer 220 and a data dashboard 230.

The software development lifecycle 210 comprises a number of phases. The present disclosure provides an exemplary lifecycle with five phases: a requirement phase 211, an application phase 212, a test plan phase 213, a test analysis phase 214, and a test execution phase 215.

The requirement phase 211 is for capturing functional requirements of a software system. A functional requirement (FR) may be defined by a capability to be achieved in the system. The FR may be further divided into a high-level requirement and one or more low-level requirements. The high-level requirement may specify a desired system capability. The capability may be decomposed into multiple component functions, with implementation details taken into consideration, where each component function is specified in a low-level requirement. Acquisition of FRs is an iterative process that may continue throughout the development lifecycle of the software system. The artifacts from this phase are the functional requirements. The acquired FRs are normally stored in a database and can be retrieved via a key field such as functional requirement identity, also referred to as an FR ID.

The application phase 212 is for implementing the software system based on the specified functional requirements. This phase may have sub-phases that include coding, unit testing, and system integration, among others. The artifacts from this phase may include software source codes, development notes, and unit testing records, among others.

The test plan phase 213 is for planning and generating test cases based on the functional requirements. One or more test cases may be mapped to one requirement. The test cases, the artifacts of this phase, may be linked to the artifacts from other phases. For example, a test case may be linked to an associated requirement via a test case ID and an FRID.

The test analysis phase 214 is for analyzing the coverage of the generated test cases. The analysis intends to ensure that the coverage of the test cases is complete. For example, a specified functional requirement is covered by a developed capability, and in turn, the capability is covered by a test case. The analysis may expose gaps or inconsistencies between the software artifacts. For example, if an inconsistency is identified between the test case and the associated capability, then a corrective action may require generating additional test cases to cover an exposed gap.

The test execution phase 215 is for executing the test cases. A test may fail or succeed. If the test case fails, a defect record is created for the defect in a defect record database. A defect triggers a corrective action that may include creating a change request to specify the detailed corrective actions to be taken.

The database layer 220 comprises a test case database 221, a software defect record database 222, and a change request database 223, according to one embodiment of the present disclosure. The type of database technologies for implementing each database is a design choice, and the choice may be a relational database, an object-oriented database, or other database technology.

The test case database 221 contains the test cases generated during the test phase. Each test case may have the fields related to the test case, such as a test ID, a test case name, a project ID, and a test description, among others. The test case may also include the fields that link the test case to artifacts from other phases. For example, an FR ID may link the test case to an FR that the test case is designed to test. An application or a capability ID may link the test case to an application or a portion of the application that the test is intended to test. A defect record ID may link the test case to a defect record that is generated from the test case.

The software defect database 222 may contain defect records generated during the test execution phase. Each defect record may have the fields related to the defect, such as a defect record ID, a root cause of the defect, a defect status, a submitter, a submitter work group (the workgroup the submitter is representing when the software defect record is created), a defect resolver, a resolver group (the workgroup responsible for resolving the software defect), correction target (the identity of the software unit that was fixed by a resolver group), and a severity level indicator, among others. The defect record may also include the fields that may link this defect to artifacts from other phases. For example, a test case ID may link the defect to a test case. An FR ID may link this defect to an associated FR. An application or a capability ID may link the defect to an application or a portion of the application that is associated with the defect.

The change request (CR) database 223 is for storing a change request that is generated in response to an identified defect. Each change request may have the fields related to the change request itself, such as a change request ID, an estimated level of effort, a request status, and a proposed corrective action, among others. The change request may also include the fields that link this change request to artifacts from other phases. For example, a test case ID may link the change request to an associated test case. A defect record ID may link the change request to a defect for which this change request is created. An FR ID may link this change request to an associated FR. An application or a capability ID may link the change request to an application or a portion of the application that is associated with the change request.

The data dashboard 230 comprises a metrics generator 231, an analysis module 232, and a graphical user interface (GUI) 233. The data dashboard components described herein may be implemented as a single module, or separate modules, as a matter of the design choice. The data dashboard 230 provides a focal point for managing a variety of software artifacts related to software defects.

The metrics generator 231 is configured to synthesize data elements from multiple databases, and generate a metrics report. The multiple databases may include the test case database 221, the software defect record database 222, and the change request database 223, among others. The metrics generator 231 may generate a variety of reports, based on the criterion a user enters, for example, using the GUI 233. One example metric may be the data elements associated with a test case, such as the test case itself, the associated defect record, the change request, the application, and the functional requirement, among others. Another example metric may be a summary view of the currently outstanding software defects, including defect IDs, associated test case IDs, and associated FR IDs. The metrics generator 231 may use analysis results from the analysis module 232 to generate an analytic report for use by a management team. For example, the metrics generator 231 may generate a report on defect repair cost estimates by tracing the data elements associated with a defect and by summing up the estimated efforts for each involved element. A user may be able to configure the fields of a metrics report, and specify the included fields and the excluded fields.

The analysis module 232 is configured to analyze and correlate data elements from a plurality of databases for management of test-identifiable defects and defects not-identifiable-by-test. The plurality of databases may include the test case database 221, the software defect record database 222, and the change request database 223, among others. The analysis module 232 may identify an inaccuracy of a test case to help identify a root cause of a defect. The analysis module 232 may compare one data element from one of the databases with another data element from another of the databases to identify an inconsistency between the two data elements. The identified gap may be used to help uncover a defect not-identifiable-by-test.

The GUI 233 is configured to present a generated metric to a user. The GUI 233 may also allow a user to query for a metrics report or a data element from one of the databases. The GUI may also allow a user to navigate from one data element from one of the databases to one or more elements from another of the databases. For example, the GUI 233 may allow the user to trace from a change request to an associated defect report, from the associated defect report to a test case, and from the test case to a functional requirement.

Figure 3:
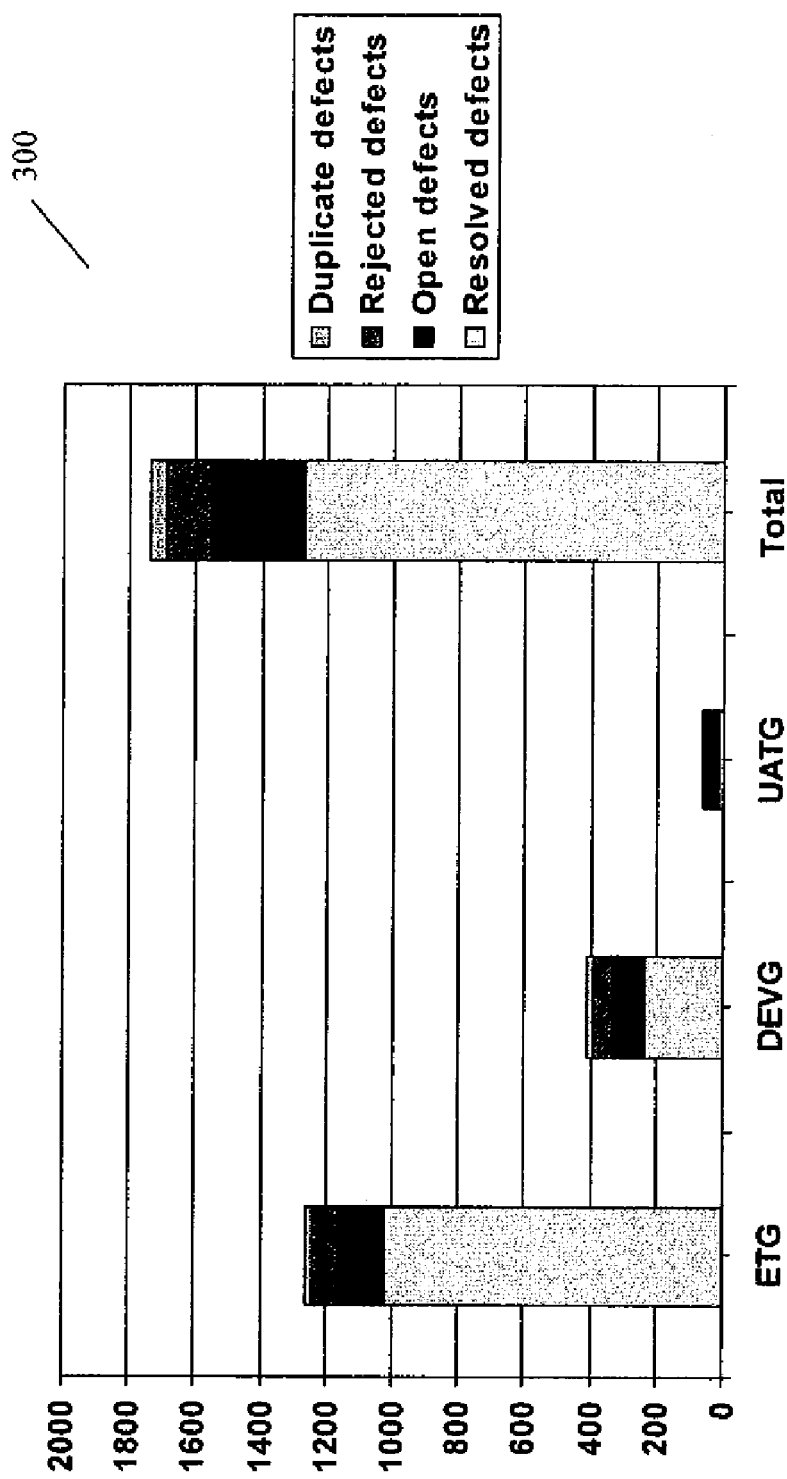
FIG. 3 shows an exemplary metrics report.

FIG. 3 shows an exemplary metric 300 that may be generated from the metrics generator 231. The metric 300 shows the software defect status by submitter groups. The defect submitter groups shown in the metric 300 includes an enterprise testing group (ETG), a development group (DEVG), and a user acceptance testing group (UATG). The software defect status as shown in the metric 300 may be resolved, open, rejected, or duplicate. The software defect metric 300 provides a summary view of the software defects submitted by the three groups and a useful tool for managing software defects. FIG. 3 is illustrative of only one of the numerous reports and analysis available using the present system, and other reports and analysis will readily suggest themselves to one skilled in the art.

Figure 4:
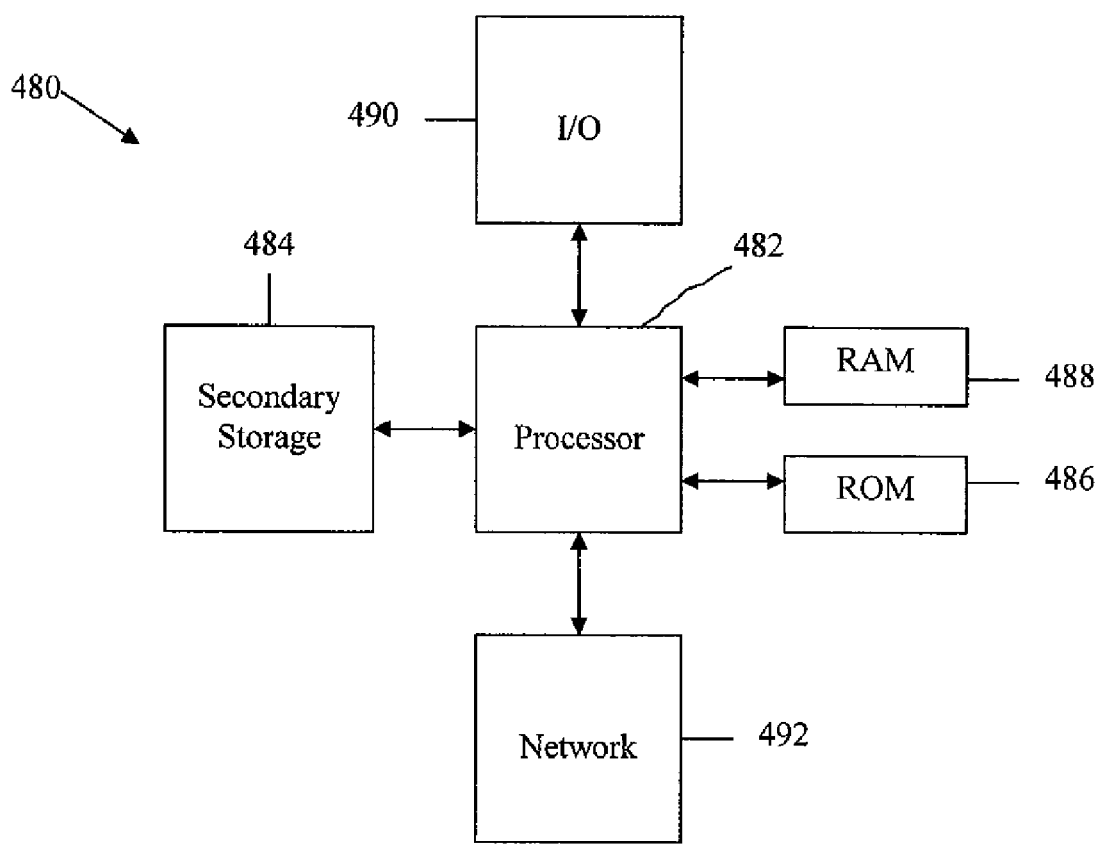
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A non-transitory readable medium implementing a method for managing software defects, comprising:
   capturing a plurality of test cases into a test case database, wherein each captured test case comprises a test case identifier;
   capturing a plurality of software defects into a software defect record database, wherein each captured software record defect comprises a software defect record identity and a test case identity associated with the software defect record identity;
   capturing a plurality of change requests into a change request database, wherein each captured change request comprises a change request identity and an associated software defect record identity;
   analyzing data elements from the test case database, the software defect record database, and the change request database to manage a test-identifiable defect and a defect not-identifiable-by-test;
   managing a test-identifiable defect by detecting a failure of a test case stored in the test case database, generating a detect report for storage in the software defect record database and linking a defect report identifier for the generated defect report with a test case identifier for the test case, creating a change request for storage in the change request database to initiate a corrective action, and linking a change request identifier for the created change request with the defect report identifier for the generated defect report; and
   managing a defect not-identifiable-by-test by identifying an inconsistency between two linked software artifacts with corresponding identifiers stored in separate databases selected from the test case database, the defect report database, the change request database, and a functional requirements database.

2. The non-transitory computer readable medium of claim 1, further comprising capturing a plurality of test cases into the test case database, capturing a plurality of defect records into the defect record database, capturing a plurality of change requests into the change request database, and capturing linking identifiers to allow traceability between captured test cases, captured defect records, and captured change requests.

3. The non-transitory computer readable medium of claim 1, wherein the method comprises identifying one of the test cases in the test case database for reuse for a new functional requirement.

4. The non-transitory computer readable medium of claim 3, wherein identifying a test case for reuse for the new functional requirement comprises comparing a capability associated with the test case with the new functional requirement.

5. The non-transitory computer readable medium of claim 1, wherein managing the test-identifiable defect comprises running a test case, creating a defect record upon a failure of the test case, and generating a change request for the test case, in that order.

6. The non-transitory computer readable medium of claim 1, wherein managing the test-identifiable defect comprises tracing the defect through linked databases to one or more of functional requirements from the functional requirements database.

7. The non-transitory computer readable medium of claim 1, wherein managing the test-identifiable defect comprises identifying an inconsistency between a test case in the test case database and a linked functional requirement the test case is intended to test.

8. The non-transitory computer readable medium of claim 1, wherein managing the defect not-identifiable-by-test comprises identifying an inconsistency between a functional capability of an application system and one of a plurality of functional requirements in the function requirements database.

9. The non-transitory computer readable medium of claim 1, wherein managing the defect not-identifiable-by-test comprises creating a change request, generating a defect report, and creating a test case, in that order.

10. A system for managing software defects, comprising:
a processor;
a memory coupled to the processor, the memory storing a data dashboard program;
a test case database containing a plurality of test cases, each of the test cases comprising a test case identifier;
a software defect record database containing a plurality of software defect records, each of the software defect records comprising a software defect record identity and a test case identity associated with the software defect record; and
a change request database containing a plurality of change requests, each of the change requests comprising a change request identity and an associated software defect record identity;
wherein the data dashboard program, when executed, causes the processor to analyze data elements from the test case database, the software defect record database, and the change request database, and promote management of a test-identifiable defect and a defect not-identifiable-by-test,
wherein the data dashboard program, when executed, further causes the processor to promote management of the test-identifiable defect by detecting a failure of a test case stored in the test case database, generating a defect report to be stored in the software defect record database, linking a defect report identifier for the generated defect report with a test case identifier for the failed test case, creating a change request to be stored in the change request database to initiate a corrective action, and linking a change request identifier for the created change request with the defect report identifier for the generated defect report, and
wherein the data dashboard, when executed, further causes the processor to promote management of the defect not-identifiable-by-test by identifying an inconsistency between two linked software artifacts with corresponding identifiers stored in separate databases selected from the test case database, the defect report database, the change request database, and a functional requirement database.

11. The system of claim 10, wherein the data elements of the test case database comprises a capability the test case is designed to test and a functional requirement identity for the capability.

12. The system of claim 10, wherein the data elements of the defect record database comprises a defect description, a defect cause analysis, an initiator identity, an application identity, a defect root cause, and a functional requirement identity.

13. The system of claim 10, wherein the data elements of the change request database comprise a level of effort indicator and a functional requirement identity.

14. The system of claim 10, where the data dashboard program comprises an analysis module that, when executed, is configured to analyze and correlate the data elements to identify an inaccuracy of a test case, identify a test case for reuse for a new functional requirement, and facilitate management of the defect not-identifiable-by-test and the test-identifiable defect.

15. The system of claim 10, wherein the data dashboard program, when executed, is configured to synthesize the data elements and generate a metrics report.

16. The system of claim 10, wherein the data dashboard program, when executed, comprises a graphic user interface configured to present a metric report.

17. The system of claim 10, wherein the data dashboard program, when executed, is configured to allow a user to navigate from a first data element from one of a plurality of databases comprising the test case database, the defect record database, and the change request database to a second data element from one of the plurality of databases.

18. The system of claim 10, wherein the data dashboard program, when executed, is configured to refresh a local data store from the test case database, the defect database and the change request database at a configurable interval.

19. A system, comprising:
a processor;
a memory coupled to the processor, wherein the memory stores a data dashboard program having:
a graphical user interface to allow a user to enter queries for a data element from one of a plurality of databases comprising a test case database, a defect record database, and a change request database, and navigate from a first data element from one of the plurality of databases to a second data element from one of the plurality of databases;
an analysis module configured to analyze and correlate data elements from the plurality of databases to identify an inaccuracy of a test case and a test case for reuse for a new functional requirement, and facilitate management of a defect not-identifiable-by-test and a test-identifiable defect,
wherein the analysis module is configured to facilitate management of the test-identifiable defect by detecting a failure of a test case stored in the test case database, generating a defect report to be stored in the software defect record database, linking a defect report identifier for the generated defect report with a test case identifier for the failed test case, creating a change request to be stored in the change request database to initiate a corrective action, and linking a change request identifier for the created change request with the defect report identifier for the generated defect report, and
wherein the analysis module is configured to facilitate management of the defect not-identifiable-by-test by identifying an inconsistency between two linked software artifacts with corresponding identifiers stored in separate databases selected from the test case database, the defect report database, the change request database, and a functional requirement database;

a metrics generator configured to generate a metrics report based on a criterion entered at the graphical user interface; and a local data store configured to hold a subset of the plurality of databases.

20. The system of claim 19, wherein the analysis module comprises a component configured to manage one of software defects comprising test-identifiable defects and defects not-identifiable-by-test, by tracing one of the plurality of test cases in the test case database to one of the plurality of defect records in the defect record database, and by tracing one of the plurality of change requests in the change request database to the traced defect record in the defect record database.

* * * * *